United States Patent [19]

Cain

[11] 4,397,177
[45] Aug. 9, 1983

[54] HYDRAULIC FILTER PRESS
[75] Inventor: David E. Cain, Houston, Tex.
[73] Assignee: Halliburton Company, Duncan, Okla.
[21] Appl. No.: 242,159
[22] Filed: Mar. 9, 1981
[51] Int. Cl.³ ............................................. G01N 15/04
[52] U.S. Cl. .................................. 73/61.4; 210/416.1
[58] Field of Search ............................ 73/61.4, 61 R; 210/416.1

[56] References Cited

U.S. PATENT DOCUMENTS

| | | |
|---|---|---|
| 316,048 | 4/1885 | Mayo . |
| 978,265 | 12/1910 | Barnett . |
| 1,243,917 | 10/1917 | Bley . |
| 1,595,344 | 8/1926 | Lomax .......................... 210/416.1 X |
| 1,712,848 | 5/1929 | Rose . |
| 2,084,439 | 6/1937 | Hamer . |
| 2,451,390 | 10/1948 | Humphreys . |
| 2,626,087 | 1/1953 | Howard et al. . |
| 2,646,678 | 7/1953 | Standing et al. ................. 73/61.4 X |
| 2,733,595 | 2/1956 | Twining ........................... 73/61.4 X |
| 3,013,697 | 12/1961 | Gill . |
| 3,055,208 | 9/1962 | Gallus ........................... 210/416.1 X |
| 3,271,999 | 9/1966 | Dwyer et al. .................. 210/416.1 X |
| 3,286,510 | 11/1966 | Parker ................................... 73/61.4 |
| 3,289,467 | 12/1966 | Parker et al. ......................... 73/61.4 |
| 3,747,415 | 7/1973 | Nickles et al. ......................... 73/433 |
| 3,898,010 | 8/1975 | Jungbluth et al. . |
| 4,154,543 | 5/1979 | Moewe et al. . |
| 4,197,846 | 4/1980 | Bucalo . |

FOREIGN PATENT DOCUMENTS

| | | | |
|---|---|---|---|
| 226081 | 12/1924 | United Kingdom ............... | 73/61 R |
| 1363793 | 8/1974 | United Kingdom ................ | 73/61.4 |

OTHER PUBLICATIONS

"Applied Mud Technology", brochure of IMCO Services, 1978, at pp. 2-4 thereof.

Primary Examiner—Steven L. Stephan
Assistant Examiner—Joseph W. Roskos
Attorney, Agent, or Firm—Lucian Wayne Beavers; James R. Duzan; Thomas R. Weaver

[57] ABSTRACT

A hydraulic filter press apparatus includes a filtration cell which includes a container for receiving a sample of the drilling mud, a pressure inlet communicating with the container, a bladder for preventing fluid communication between the drilling mud sample and the pressure inlet and for transmitting hydraulic pressure from the pressure inlet to the drilling mud sample, a filter arranged for contacting the drilling mud sample in the container, and a liquid outlet for draining the liquid pressed from the drilling mud sample through the filter. A pump is provided for supplying hydraulic fluid under pressure to the pressure inlet of the filtration cell, which pump includes a pump body having a cylindrical bore disposed therein and an outlet port for communicating the bore with the pressure inlet of the filtration cell. The pump also includes a rotatable piston member threadedly engaged with the pump body for pressurizing fluid contained in the bore upon rotation of the piston member relative to the pump body. A pressure regulator includes a high pressure inlet communicated with the outlet port of the pump, and includes a regulated pressure outlet communicated with the fluid pressure inlet of the filtration cell.

28 Claims, 6 Drawing Figures

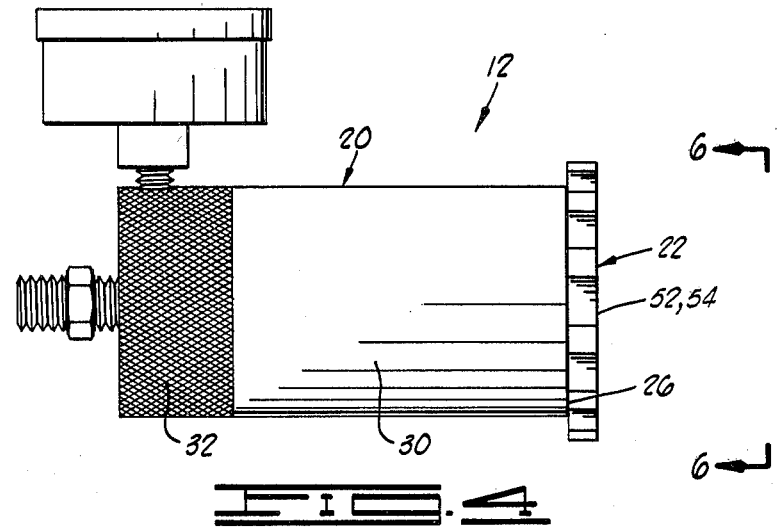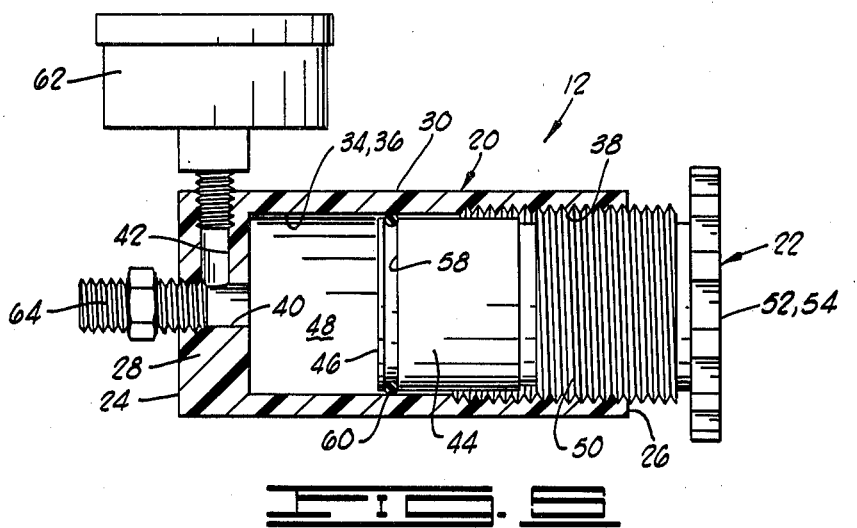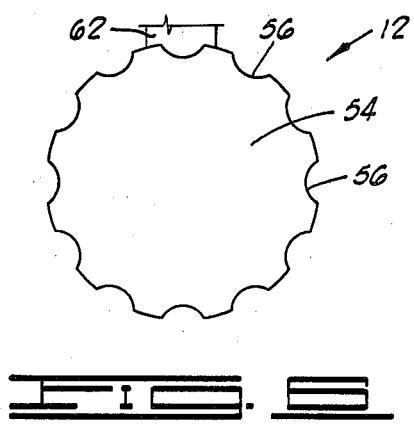

HYDRAULIC FILTER PRESS

The present invention relates generally to apparatus and methods for measuring filtration characteristics of a fluid including suspended solids, and more particularly, but not by way of limitation, to apparatus and methods for conducting such tests at an oil or gas well field location.

During the drilling of an oil or gas well, drilling mud is circulated through the well bore for purposes of removing cuttings from the drill bit and rock interface, cooling the drill bit, maintaining sufficient hydrostatic pressure within the well to prevent blowouts, and numerous other duties. Such drilling mud, when placed opposite or circulated past a permeable formation, will lose some of its liquid phase into that formation. In other words, some water will be lost from the drilling fluid which itself is a fluid including solids suspended in water.

These mud solids will deposit on the walls of the well bore hole and form a filter cake, ideally about 1/32 inch thick. Liquid lost to the formation is referred to as the filtrate, and the relative rate at which this fluid is lost is referred to as the fluid or water loss. Fluid loss is affected by the permeability of the formation, the differential pressure between the mud and the formation, and the filtration characteristics of the drilling mud.

Standard tests have been developed for measuring the relative fluid loss of a drilling mud. In these tests, mud is poured into a small cell, generally referred to as a filtration cell, containing a special filter paper or filter disc. The cell is sealed and $CO_2$ gas pressure is applied to the mud, forcing filtrate through the paper disc. The filtrate is collected in a graduated cylinder for thirty minutes. Fluid lost is then reported as cubic centimeters per thirty minutes.

A typical prior art $CO_2$ pressure supply system includes a $CO_2$ cartridge which contains $CO_2$ at a pressure of approximately 800 psi. A pressure regulator is connected to the $CO_2$ cartridge and has a regulated pressure output of approximately 100 psi. Pressure gauges are present on the $CO_2$ cartridge output and the regulated pressure output of the pressure regulator. The filtration cell which is utilized in the prior art is the same as the one illustrated in the drawings of the present application except that the prior art filtration cell does not include the bladder means which is utilized in the present invention. The prior art system includes a coupler means for connecting the pressure regulator to the filtration cell, which coupler means is the same as the coupler means disclosed in the present application.

Typical prior art methods and apparatus are described in a brochure of IMCO SERVICES, entitled "Applied Mud Technology", dated 1978, at pages 2-4 thereof.

A primary difficulty encountered in the use of the prior art apparatus and methods described above, is that the $CO_2$ cartridges are often unavailable in the field, and also are difficult to ship on certan airlines. These problems are remedied by the present invention which provides a very small lightweight, easily handled, hand operated hydraulic pump, with associated apparatus for directing the hydraulic fluid under pressure to the filtration cell. The pump includes a pump body and a threaded piston member for pressurizing the hydraulic fluid upon rotation of the piston member relative to the pump body. The filtration cell is provided with a bladder means for isolating the drilling mud from the hydraulic fluid so as to prevent contamination of the sample.

The prior art includes several pressure producing apparatus which utilize the concept of a threaded piston for exerting a force against a contained fluid upon advancement of the piston due to rotation thereof. One such device is shown in U.S. Pat. No. 978,265 to Barnett. FIG. 3 of Barnett discloses a plunger type hand operated pump which additionally includes a hollow rod "f" disposed about the plunger rod "d". The hollow rod "f" threadedly engages the pump body and may be advanced by rotation to engage the piston "c" so as to provide greater force against the piston "c" than could otherwise be provided by the conventional plunger actuation.

Another group of structures, which utilizes the concept of pressurization of a fluid upon advancement of a threaded member which is rotated, include U.S. Pat. No. 4,154,543 to Moewe et al., U.S. Pat. No. 3,898,010 to Jungbluth et al., and U.S. Pat. No. 2,080,439 to Hamer. All of these devices are directed to a means for disassembly of a tapered connection such as a tapered connection between a shaft and a member attached to an end of the shaft by a press fit of complementary tapered surfaces. There, the hydraulic pressure is utilized to break the pressed fit connection between the tapered surfaces.

Another somewhat related concept is shown in U.S. Pat. No. 2,451,390 to Humphreys. The Humphreys patent discloses a hydraulic jack which includes a pump, the piston of which is reciprocated upon rotation thereof due to a roller 44 which is received within a continuous cam groove 46.

Also, the prior art inclues other types of hand operated pumps utilized in the oil field. For example, U.S. Pat. No. 3,747,415 to Nickles et al., and assigned to the assignee of the present invention, discloses an apparatus for measuring the density of drilling mud. That apparatus includes a plunger type hand operated pump.

The hydraulic filter press of the present invention includes a filtration cell which includes a container for receiving a sample of the drilling mud, a pressure inlet communicating with the container, a bladder for preventing fluid communication between the drilling mud sample and the pressure inlet and for transmitting hydraulic pressure from the pressure inlet to the drilling mud sample, a filter arranged for contacting the drilling mud sample in the container, and a liquid outlet for draining the liquid pressed from the drilling mud sample through the filter. A pump is provided for supplying hydraulic fluid under pressure to the pressure inlet of the filtration cell, which pump includes a pump body having a cylindrical bore disposed therein and an outlet port for communicating the bore with the pressure inlet of the filtration cell. The pump also includes a rotatable piston member threadedly engaged with the pump body for pressurizing fluid contained in the bore upon rotation of the piston member relative to the pump body. A pressure regulator includes a high pressure inlet communicated with the outlet port of the pump, and includes a regulated pressure outlet communicated with the fluid pressure inlet of the filtration cell. Methods of testing are also disclosed.

Numerous objects, features and advantages of the present invention will be readily apparent to those skilled in the art upon a reading of the following disclosure when taken in conjunction with the accompanying drawings.

FIG. 4 is a side view of the pump means of FIG. 1.

FIG. 5 is a view similar to FIG. 4 with the pump body sectioned so as to disclose the internal components of the pump.

FIG. 6 is an end view taken along line 6—6 of FIG. 4.

Figure 1:
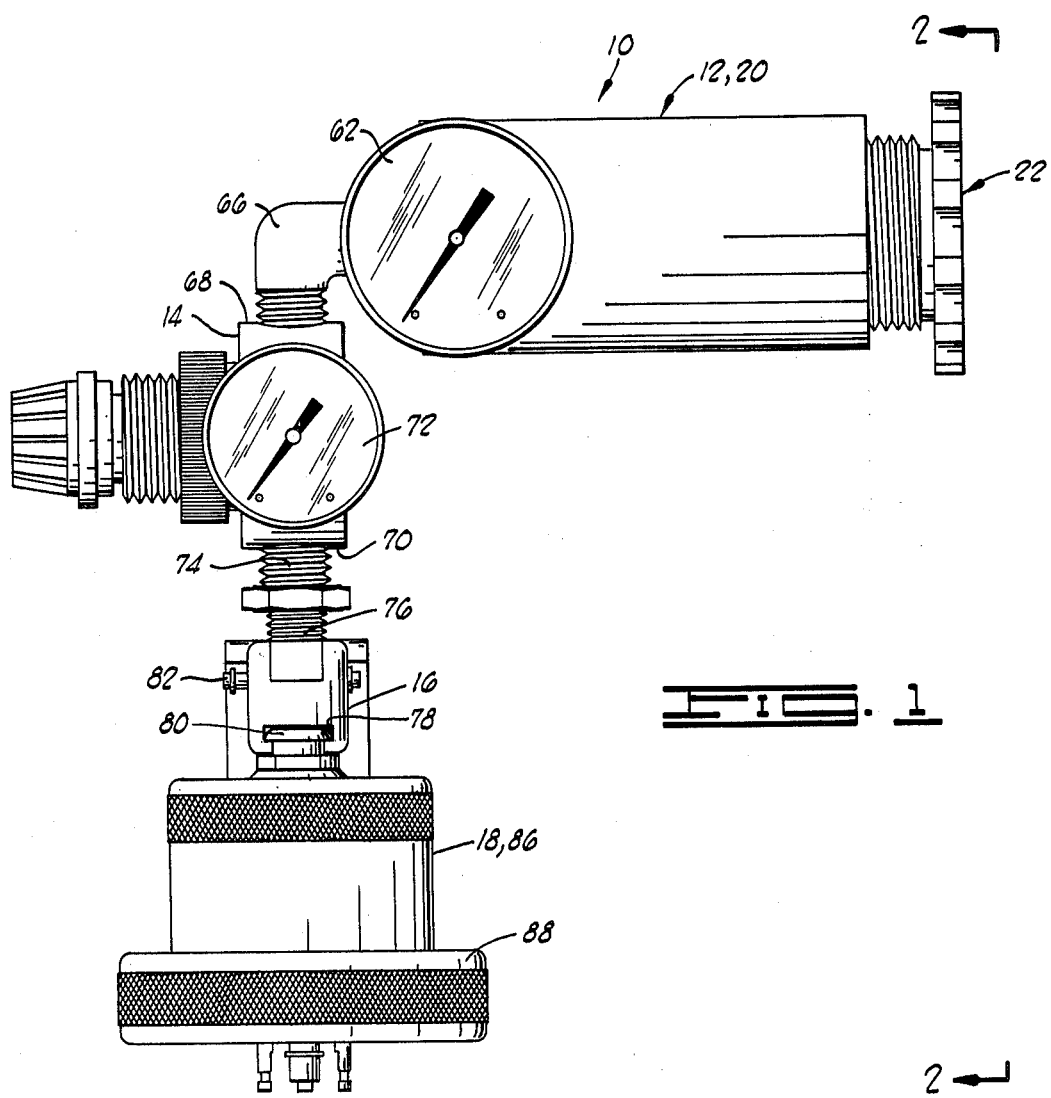
FIG. 1 is a front elevation view of the hydraulic filter press apparatus of the present invention.
Figure 2:
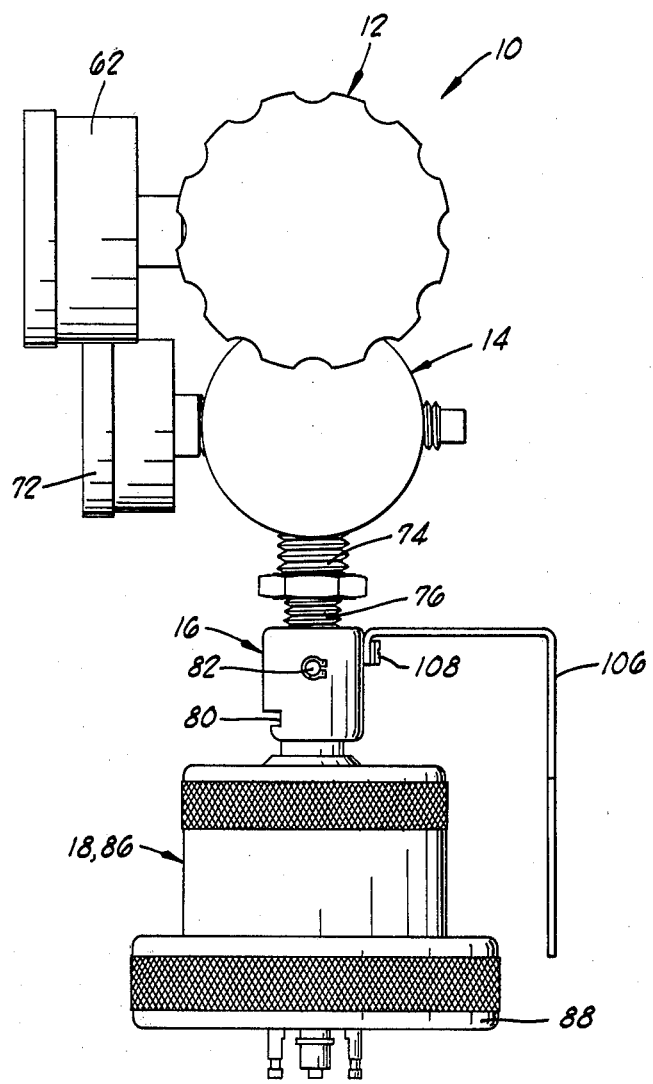
FIG. 2 is a side elevation view of the apparatus of FIG. 1 taken along line 2—2 of FIG. 1.

Referring now to the drawings, and particularly to FIGS. 1 and 2, the hydraulic filter press apparatus of the present invention is shown and generally designated by the numeral 10. The apparatus 10 includes a pump 12, a pressure regulator 14, a coupler 16, and a filtration cell 18. The pump 12 is best shown in FIGS. 4, 5, and 6.

The pump 12 includes a pump body, generally designated by the numeral 20 and a piston member, generally designated by the numeral 22. The pump body 20 is a hollow cylindrical pump body integrally constructed from a single piece of plastic material.

Pump body 20 includes a closed first end 24 and an open second end 26. First end 24 is closed by a wall 28.

A constant diameter outer cylindrical pump body surface 30 extends from first end 24 to second end 26. Outer cylindrical surface 30 includes a knurled outer surface portion 32 arranged to be gripped by a thumb and forefinger of a human hand.

A bore 34 is centrally disposed in pump body 20 and includes a first bore portion 36 adjacent first end 24 and a threaded second bore portion 38 adjacent second end 26. First and second bore portions 36 and 38 are of substantially equal length.

End wall 28 has an outlet port 40 disposed axially through a center thereof. A monitoring port 42 is radially disposed in said end wall 28 and intersects outlet port 40. Both the outlet port 40 and monitoring port 42 may be described as being disposed through pump body 20 and communicating the first bore portion 36 of bore 34.

The piston member 22 is integrally constructed from a second single piece of plastic material and it is preferably machined from a length of solid, round barstock. This use of plastic materials allows the pump to be lightweight and corrosion resistant. This corrosion resistance feature is particularly important due to the corrosive environment present in the oil field, especially offshore.

Piston member 22 includes a first outer cylindrical surface 44 adjacent a first end 46 of piston member 22. Surface 44 is closely received within first bore portion 36 of pump body 20 to define a closed pressurizing chamber 48. Pressurizing chamber 48 is defined by first bore portion 36, end wall 28 of first end 24, and first end 46 of piston member 22.

Piston member 22 further includes a threaded second outer cylindrical surface 50 threadedly engaged with threaded second bore portion 38 of bore 34 of pump body 20 so that rotation of piston member 22 relative to pump body 20 moves piston member 22 axially within bore 34 of pump body 20 to vary a volume of pressurizing chamber 48 and thereby vary a pressure exerted on a fluid contained within pressurizing chamber 48.

Located at a second end 52 of piston member 22 is a handgrip means 54. The handgrip means 54 is substantially disc shaped, as is best seen in FIG. 6, and has an outer diameter greater than the constant diameter of outer cylindrical surface 30 of pump body 20. A series of indentations 56 are machined in the outer circumference of handgrip 54 so that handgrip 54 may be more securely gripped by the fingers of a human hand.

As shown in FIG. 4, handgrip means 54 has an inwardmost position wherein handgrip means 54 abuts open second end 26 of pump body 20.

First cylindrical surface 44 of piston member 22 has an annular groove 58 disposed therein adjacent first end 46 of piston member 22. A resilient O-ring seal means 60 is disposed in groove 58 for sealing between first outer cylindrical surface 44 of piston member 22 and first bore portion 36 of pump body 20.

A pressure gauge 62 is attached to monitoring port 42 for monitoring the pressure of fluid contained in pressurizing chamber 48. A threaded nipple 64 is attached to outlet port 40.

The construction just described for the pump 12 provides a hand operated pump which may be easily operated by holding the pump body 20 in one hand with a thumb and forefinger of that first hand encircling the knurled portion 32, and by holding the handgrip 54 in the other hand. Then, by rotation of the piston member 22 relative to the pump body 20, fluid contained within the pressurizing chamber 48 is pressurized. Thus, in any application such as that of the present invention where a small volume of pressurized fluid is required in a generally non-steady state flow, the pump 12 is very suitable.

Referring again to FIG. 1, the nipple 64 is threadedly attached to an elbow 66. Elbow 66 is threadedly connected to a high pressure inlet 68 of pressure regulator means 14.

Pressure regulator means 14 is itself part of the prior art and is a means for regulating a high pressure input so as to provide a regulated constant pressure output at regulated pressure outlet 70. A second pressure gauge 72 indicates the pressure of the fluid at regulated pressure outlet 70.

A fitting 74 threadedly engages outlet 70. Coupler means 16 includes a threaded nipple 76 which threadedly engages fitting 74.

Coupler 16 is itself a part of the prior art. Coupler 16 is a cylindrical member having a recess 78 disposed therein for receiving a flange 80 of filtration cell 18, so that coupler 16 is detachably connected to filtration cell 18.

Coupler means 16 has a fluid passage disposed therethrough which communicates with the flange 80 and includes a resilient O-ring seal surrounding the end of the fluid passage means adjacent flange 80 for sealing between coupler 16 and flange 80.

Coupler means 16 includes a bleed-off valve which has a valve spool 82 which is movable between a first position for communicating regulated pressure outlet 70 with filtration cell 18 and a second position for blocking regulated pressure outlet 70 and venting a pressure inlet 84 of filtration cell 18.

Figure 3:
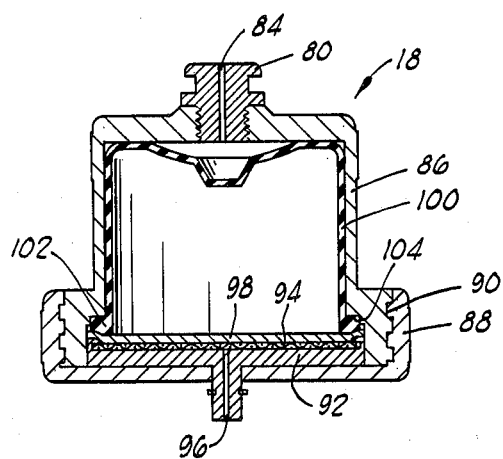
FIG. 3 is an elevation section view of the filtration cell.

Referring now to FIG. 3, a sectioned elevation view of filtration cell 18 is thereshown. Filtration cell 18 includes a container means 86 for receiving a sample of drilling mud. The pressure inlet 84 is communicated with the interior of container means 86.

A cap 88 is threadedly engaged with container means 86 at threaded connection 90 and holds a cover plate 92 in place against container means 86.

Cover plate 92 includes a fine mesh metal screen 94 and a liquid outlet 96.

A disc of filter paper 98 is layed in place over metal screen 94. Filter paper 98 simulates the mud cakes on the wall of a well bore hole.

A cup shaped bladder means 100 is placed within container 86 and includes a flange portion 102 which is held between filter paper 98 and a downward facing shoulder 104 of container means 86. The bladder means 100 actually holds the sample of drilling mud and prevents fluid communication between the drilling mud sample and the pressure inlet 84. The drilling mud sample in bladder 100 is in contact with an upper side of filter paper 98. The bladder means 100 is constructed from a resilient material such as rubber and also provides a means for transmitting hydraulic pressure from the pressure inlet 84 to the drilling mud sample within bladder 100 while preventing mixing of the hydraulic fluid entering inlet 84 with the drilling mud sample.

As is best seen in FIG. 2, a mounting bracket 106 is attached to coupler means 16 by a screw 108.

The hydraulic filter press apparatus 10 is utilized in the following manner to measure the filtration characteristics of a drilling mud.

The apparatus 10 is typically mounted by placing the vertically extending portion of bracket 106 in a channel shaped bracket (not shown) adapted for receiving the same so that the filtration cell 18 hangs downward from coupler 16 as shown in FIGS. 1 and 2.

The filtration cell 18 is from coupler 16 and the capp 88 is removed.

With the container 86 held in an inverted position, the cup shaped bladder means 100 is filled with a sample of the drilling fluid. The filter paper element 98 is then placed over the open bottom end of the bladder means 100 and the cap 88 is attached to the container means 86 as shown in FIG. 3.

The flange 80 of filtration cell 18 is then placed within the recess 78 of coupler means 16 as shown in FIGS. 1 and 2, thereby connecting pressure inlet 84 of filtration cell 18 with the coupler means 16, pressure regulator 14 and pump 12.

The bore of the pump 12 is filled with a hydraulic fluid by removing the piston member 22 and filling the bore then replacing the piston member. This is done before the apparatus 10 is hung in the vertical position with the bracket 106. The hydraulic fluid is preferably water, a liquid hydrocarbon, or a glycol and water mixture.

After the filtration cell 18 is attached to the coupler 16, pressure is applied to the hydraulic fluid by hand operation of the pump 12 and thereby hydraulic fluid under pressure is supplied to the pressure inlet 84 of the filtration cell 18. The bladder means 100 transmits this hydraulic pressure to the drilling mud sample and presses water out of the drilling mud sample through the filter paper 98, then through the screen 94 to the drain port 96.

The pressure supplied to filtration cell 18 from pump 12 is regulated by pressure regulator 14.

Thus it is seen that the apparatus and methods of the present invention readily achieve the ends and advantages mentioned as well as those inherent therein. Numerous changes in the arrangement and construction of parts will be apparent to those skilled in the art, which changes are embodied in the scope and spirit of the present invention as defined by the appended claims.

What is claimed is:

1. An apparatus for pressing liquid from a fluid including suspended solids, comprising:
   a filtration cell having a container means for receiving a sample of said fluid, having a pressure inlet communicating with said container means, having a filter means, one side of which is arranged for contacting said fluid sample in said container means, and having a liquid outlet for draining liquid pressed from said fluid sample through said filter means;
   a hand operated hydraulic pump means, communicated with said pressure inlet of said filtration cell, for supplying hydraulic fluid under pressure to said pressure inlet;
   a pressure regulator means for regulating the hydraulic pressure supplied to said filtration cell, said regulator means including a high pressure inlet communicated with said pump means and including a regulated pressure outlet communicated with said pressure inlet of said filtration cell; and
   coupler means, connected to said regulated pressure outlet of said pressure regulator means and detachably connected to said filtration cell.

2. The apparatus of claim 1, wherein:
   said coupler means includes a bleed-off valve means movable between a first position for communicating said regulated pressure outlet with said pressure inlet of said filtration cell and a second position for blocking said regulated pressure outlet and venting said pressure inlet of said filtration cell.

3. An apparatus for pressing liquid from drilling mud, comprising:
   a filtration cell, including:
   a container means for receiving a sample of said drilling mud;
   a pressure inlet communicating with said container means;
   a bladder means for preventing fluid communication between said drilling mud sample and said pressure inlet and for transmitting hydraulic pressure from said pressure inlet to said drilling mud sample;
   a filter means, a first side of which is arranged for contacting said drilling mud sample in said container means; and
   a liquid outlet for draining liquid pressed from said drilling mud sample through said filter means;
   pump means for supplying hydraulic fluid under pressure to said pressure inlet of said filtration cell, including:
   a pump body having a cylindrical bore disposed therein and an outlet port means for communicating said bore with said pressure inlet of said filtration cell; and
   a rotatable piston member means, threadedly engaged with said pump body, for pressurizing fluid contained in said bore upon rotation of said piston member means relative to said pump body; and
   a pressure regulator means for regulating the hydraulic pressure supplied to said filtration cell, said regulator means including a high pressure inlet communicated with said outlet port means of said pump means and including a regulated pressure outlet communicated with said pressure inlet of said filtration cell.

4. The apparatus of claim 3, further comprising:
coupler means, connected to said regulated pressure outlet of said pressure regulator means and detachably connected to said filtration cell, said coupler means including a bleed-off valve means movable between a first position for communicating said regulated pressure outlet with said pressure inlet of said filtration cell and a second position for blocking said regulated pressure outlet and venting said pressure inlet of said filtration cell.

5. The apparatus of claim 3, further comprising:
a first pressure gauge means for indicating the hydraulic pressure at said outlet port means of said pump means; and
a second pressure gauge means for indicating the hydraulic pressure at said regulated pressure outlet of said regulator means.

6. The apparatus of claim 3, wherein said hydraulic fluid acted upon by said pump means and supplied to said pressure inlet of said filtration cell is water.

7. The apparatus of claim 3, wherein said hydraulic fluid acted upon by said pump means and supplied to said pressure inlet of said filtration cell is a liquid hydrocarbon.

8. The apparatus of claim 3, wherein said hydraulic fluid acted upon by said pump means and supplied to said pressure inlet of said filtration cell is a glycol and water mixture.

9. The apparatus of claim 3, wherein:
said pump body is cylindrical and has a closed first end and an open second end;
said bore of said pump body includes a first bore portion adjacent said first end and an internally threaded second bore portion;
said outlet port means communicates with said first bore portion; and
said piston member means includes a first cylindrical portion closely received in said first bore portion of said pump body and a threaded second cylindrical portion engaged with said internally threaded second bore portion of said pump body.

10. The apparatus of claim 9, wherein:
said pump body is integrally constructed from a first single piece of plastic material; and
said piston member means is integrally constructed from a second single piece of plastic material.

11. A method of pressing liquid from a drilling mud, said method comprising the steps of:
placing a sample of said drilling mud within a cup shaped bladder of a filtration cell;
securing a cap over an open end of said cup shaped bladder with a filter means located between said drilling mud sample and a drain port of said cap;
connecting a pressure inlet of said filtration cell to a hand operated hydraulic pump means;
applying pressure to a hydraulic fluid in said pump means by hand operation of said pump means and thereby supplying said hydraulic fluid under pressure to said pressure inlet of said filtration cell; and
transmitting hydraulic pressure from said hydraulic fluid through said bladder to said drilling mud sample and thereby pressing liquid out of said drilling mud sample through said filter means to said drain port.

12. The method of claim 11, further comprising the steps of:
regulating the hydraulic pressure supplied to said filtration cell from said pump means.

13. The method of claim 11, wherein said pump means includes a pump body having a cylindrical bore disposed therein and a rotatable piston member means threadedly engaged with said pump body, wherein:
said step of applying pressure by hand operation of said pump means includes a step of rotating said piston member means relative to said pump body and thereby pressurizing said hydraulic fluid in said pump means.

14. The method of claim 11, wherein said hydraulic fluid is water.

15. The method of claim 11, wherein said hydraulic fluid is a hydrocarbon.

16. The method of claim 11, wherein said hydraulic fluid is a water and glycol mixture.

17. An apparatus for pressing liquid from a fluid including suspended solids, comprising:
a filtration cell having a container means for receiving a sample of said fluid, having a pressure inlet communicating with said container means, having a filter means, one side of which is arranged for contacting said fluid sample in said container means, having a liquid outlet for draining liquid pressed from said fluid sample through said filter means, and having a bladder means for preventing fluid communication between said fluid sample and said pressure inlet and for transmitting hydraulic pressure from said pump means to said fluid sample; and
a hand operated hydraulic pump means, communicated with said pressure inlet of said filtration cell, for supplying hydraulic fluid under pressure to said pressure inlet.

18. The apparatus of claim 17, wherein:
said fluid sample contained in said filtration cell is drilling mud.

19. The apparatus of claim 18, wherein:
said hydraulic fluid acted upon by said pump means and supplied to said pressure inlet of said filtration cell is water.

20. The apparatus of claim 18, wherein:
said hydraulic fluid acted upon by said pump means and supplied to said pressure inlet of said filtration cell is a liquid hydrocarbon.

21. The apparatus of claim 18, wherein:
said hydraulic fluid acted upon by said pump means and supplied to said pressure inlet of said filtration cell is a glycol and water mixture.

22. An apparatus for pressing liquid from a fluid including suspended solids, comprising:
a filtration cell having a container means for receiving a sample of said fluid, having a pressure inlet communicating with said container means, having a filter means, one side of which is arranged for contacting said fluid sample in said container means, and having a liquid outlet for draining liquid pressed from said fluid sample through said filter means;
a hand-operated, hydraulic pump means, communicated with said pressure inlet of said filtration cell, for supplying hydraulic fluid under pressure to said pressure inlet, said pump means including a pump body having a cylindrical bore disposed therein and an outlet port means for communicating said bore with said pressure inlet of said filtration cell, and including a rotatable piston member means, threadedly engaged with said pump body, for pressurizing said hydraulic fluid within said bore upon rotation of said piston member means relative to said pump body;

wherein said pump body is cylindrical and has a closed first end and an open second end;

said bore of said pump body includes a first bore portion adjacent said first end and an internally threaded second bore portion;

wherein said outlet port means communicates with said first bore portion; and wherein said piston member means includes a first cylindrical portion closely received in said first bore portion of said pump body and a threaded second cylindrical portion engaged with said internally threaded second bore portion of said pump body.

23. The apparatus of claim 22, wherein:
said pump body is integrally constructed from a first single piece of plastic material; and
said piston member means is integrally constructed from a second single piece of plastic material.

24. The apparatus of claim 22, further comprising:
resilient seal means for sealing between said first cylindrical portion of said piston member means and said first bore portion of said pump body.

25. The apparatus of claim 24, wherein:
said first cylindrical portion of said piston member means has an annular groove disposed therein adjacent a first end of said piston member means; and
said resilient seal means includes a resilient O-ring disposed in said annular groove of said piston member means.

26. The apparatus of claim 22, wherein:
said first and second bore portions of said bore of said pump body are of substantially equal lengths.

27. The apparatus of claim 22, wherein:
said piston member means further includes a substantially disc shaped handgrip having an outer diameter greater than an outer diameter of said pump body.

28. An apparatus for pressing liquid from a fluid including suspended solids, comprising:
a filtration cell having a container means for receiving a sample of said fluid, having a pressure inlet communicating with said container means, having filter means, one side of which is arranged for contacting said fluid sample in said container means, and having a liquid outlet for draining liquid pressed from said fluid sample through said filter means;

a hand operated hydraulic pump means, communicated with said pressure inlet of said filtration cell, for supplying hydraulic fluid under pressure to said pressure inlet;

a pressure regulator means for regulating the hydraulic pressure supplied to said filtration cell, said regulator means including a high pressure inlet communicated with said pump means and including a regulated pressure outlet communicated with said pressure inlet of said filtration cell;

a first pressure gauge means for indicating the hydraulic pressure at an outlet of said pump means; and a second pressure gauge means for indicating the hydraulic pressure at said regulated pressure outlet of said regulator means.

* * * * *

UNITED STATES PATENT AND TRADEMARK OFFICE
CERTIFICATE OF CORRECTION

PATENT NO. : 4,397,177
DATED : August 9, 1983
INVENTOR(S) : David E. Cain

It is certified that error appears in the above-identified patent and that said Letters Patent are hereby corrected as shown below:

In column 7, line 68, delete the word [steps] and insert --step--.

Signed and Sealed this

Thirteenth Day of December 1983

[SEAL]

Attest:

GERALD J. MOSSINGHOFF

Attesting Officer

Commissioner of Patents and Trademarks